THREE DIMENSIONAL POSITION-INDICATING SYSTEM
Filed Nov. 5, 1954
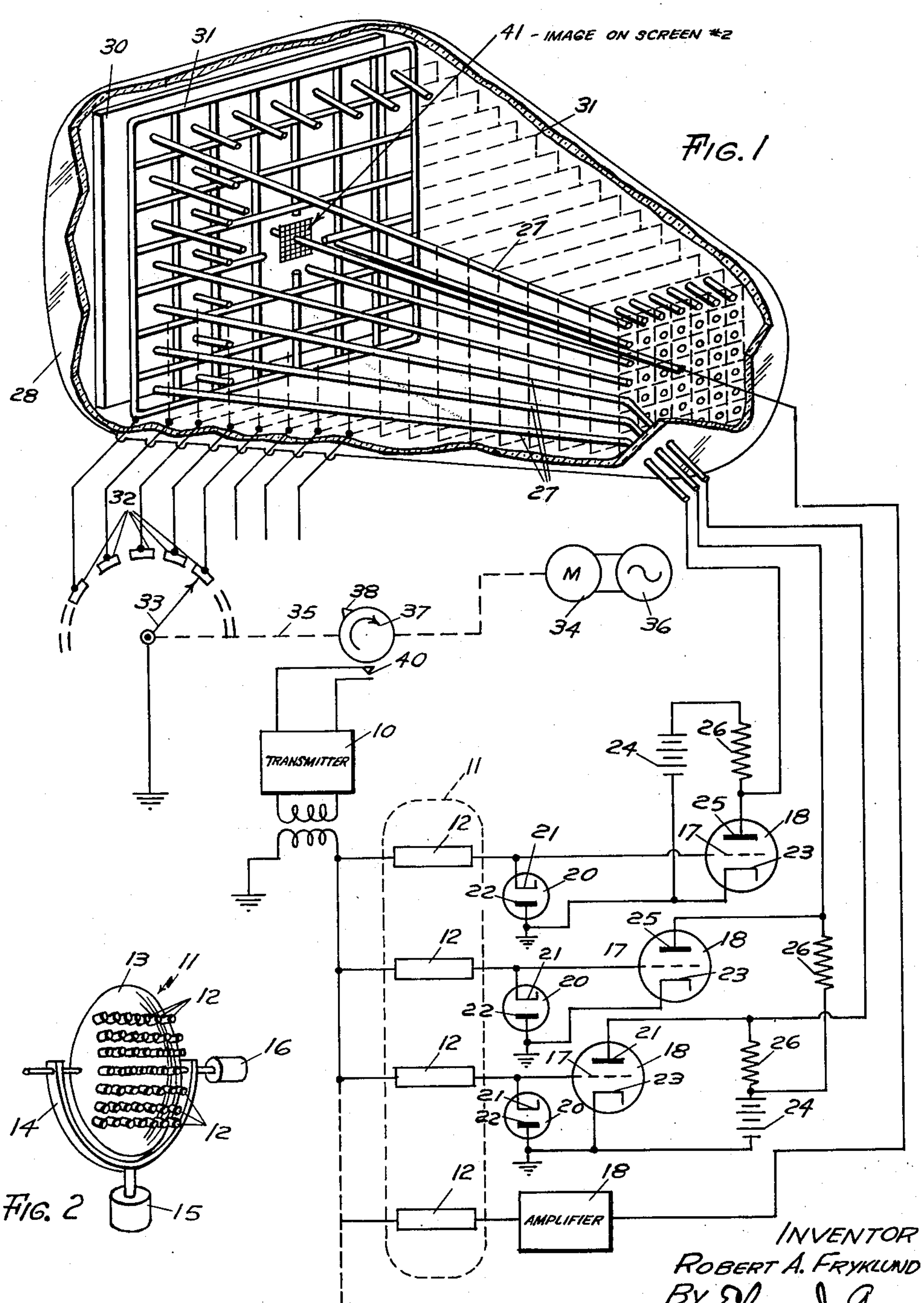
INVENTOR
ROBERT A. FRYKLUND
BY Elmer J. Gorn
ATTORNEY 2,762,031
Patented Sept. 4, 1956

2,762,031

THREE DIMENSIONAL POSITION-INDICATING SYSTEM

Robert A. Fryklund, Endwell, N. Y., assignor to Raytheon Manufacturing Company, Waltham, Mass., a corporation of Delaware Application November 5, 1954, Serial No. 467,082

17 Claims. (Cl. 340—3)

This invention concerns a position-indicating system and more particularly relates to such a system including a gaseous discharge device for presenting target information in a three-dimensional display and is an improvement on my copending application, Serial No. 438,670, filed June 23, 1954.

Echo-ranging systems are well known which indicate the range of objects from which energy is reflected by the time required for a transmitted signal to reach the object and return therefrom.

It is often desirable, as in the case of locating fish, to display objects disposed in a volume in such a way that the azimuth and elevation of the objects are indicated in addition to their range. It is further desirable to indicate azimuth, elevation and range simultaneously upon a single indicator. By means of this invention one may determine the range of each of several objects, as well as the range of portions of the same object obliquely disposed in the volume of space explored, while also locating the target in azimuth and elevation on the same indicator.

This is accomplished in the present invention by a glow discharge tube consisting of a transparent envelope of a material, such as glass, containing an ionizable gas such as neon, in which is mounted a system of rods passing through an array of apertured electrodes, such as wire screens, arranged in a plurality of planes corresponding to planes of equal range in the space to be scanned. Each rod corresponds to a beam through the scanned space with a particular azimuth and elevation. The electrical outputs of the transducers are passed through separate amplifiers to each rod. The screens are successively connected to a reference potential at a time corresponding to the range each represents. When a signal appears at the output of a particular transducer, a potential is applied to the rod corresponding to that azimuth and elevation. A glow will occur at the hole through which this rod passes in that screen which is then connected to the reference potential and indicates the range of the target. Thus a three-dimensional display of the location of the target is presented. A target that is large with respect to the increments of range, azimuth and elevation represented by the screens and rods will excite several transducers and cause several discharges to take place indicating the shape and attitude of the target. Similarly, a plurality of targets appearing in the scanned space may be displayed simultaneously. These glows may be made to persist for the period between transmitted pulses by coating the wires of the screens with a phosphor having the desired persistence.

The definition of the device may be increased for a selected portion of the total volume scanned by changing the commutation mechanism so that the reference potential is applied successively to the screens at a time after the transmitter is pulsed representing the minimum range desired and in an interval of time corresponding to the portion of the total range that it is desired to show. The array of transducers may themselves be trained in azimuth and elevation by an appropriate mechanical or electromechanical driving system to permit a display of objects present in a great volume of the medium being surveyed.

Other and further objects, advantages and features of this invention will be apparent as the description thereof progresses, reference being had to the accompanying drawing wherein:

Fig. 1 is a schematic diagram of an object-indicating system embodying the invention; and Fig. 2 is an isometric view of a type of transducer array that may be used with the indicator system of the invention.

In Fig. 1, the reference numeral 10 designates the oscillator or transmitter which applies electrical energy to each transducer of the array 11 to cause it to propagate a beam of compressional wave energy from each individual transducer into the medium in which the equipment is to be used (usually sea water). When this energy strikes an object, a certain amount of the energy is reflected back and generates electrical oscillations in the output of those transducers directed toward the object. Such an array of transducers is shown in Fig. 2. The individual transducers 12 of the array may be discs of a ceramic such as barium titanate, or any other type of transducer. These elements are preferably mounted on a spherical supporting member 13 covered with a layer of material (not shown), such as an air-foam rubber, capable of absorbing energy radiated from the back face of the transducers. The array is supported in a gimbal 14 and means, such as the motors 15 and 16, provided for rotating the array in both azimuth and elevation. The electrical signal produced by the energy reflected back to those transducers 12, which are directed toward the target, is applied to the grids 17 of the associated amplifier tubes 18 across diodes 20. These diodes have their cathodes 21 connected to the grids 17 and their plates 22 connected to the cathodes 23 of the tubes 18. A source 24 of potential is connected between the cathode and the plates 25 of the tubes 18 through resistors 26. There is one such amplifier 18 for each transducer in the array. The plate of each amplifier is connected to a rod 27 of conductive material. These rods 27 are mounted within an envelope 28 of a material such as glass and brought out through vacuum tight glass-to-metal seals. The envelope is filled with an ionizable gas, such as neon. Each of the rods 27 represents a beam from a transducer 12 of the array 11. The far ends of the rods 27 are inserted in a plate of mica or other dielectric material that is supported within the envelope 28 and serves to support the far ends of the rods 27. Only a few of these rods are shown to simplify the drawing. There is also mounted in the envelope 30 a plurality of apertured electrodes shown as wire screens 31. Only one of these screens is shown. The location of the planes of the other screens is indicated by dotted lines. Each screen represents the area scanned by the transducer array 11 at a particular range from the transducer array. The spacing between sceens 31 represents equal increments of range beginning with that representing the shortest range which is shown on the left of Fig. 1. The screens are shown diminishing in size as they proceed to the right. This is to give the effect of perspective due to beam convergence. This feature is not essential to the operation of the device. The area of each opening in each screen represents the area scanned by the beam of its corresponding transducer 12 at the corresponding range. It is to be understood that the individual beams overlap to a certain extent without preventing the device from giving a sufficiently accurate representation for practical purposes. Each screen is connected through a glass-to-metal seal in the envelope 28 to a contact 32. These contacts 32 are arranged in an arc and an arm 33 is driven by a motor 34 through a shaft indicated by the dotted line 35 past each successive contact 32. The motor is supplied with power from a source 36. The arm 33 is connected to ground. A cam 37 is mounted for rotation with the shaft 35. The cam 37 is provided with a rise 38 that operates a pair of contacts 40 connected in the transmitter 10 to cause the transmitter to emit a pulse of energy which drives the transducers 12, causing them to emit outgoing pulses. These pulses occur just before the arm reaches the contact 32 connected to the screen 31 representing the shortest range.

In operation, as the arm 33 connects each contact 32 and its associated screen 31 to ground, if any of the transducers 12 is receiving a reflex, it will produce a potential on its corresponding rod 27. The presence of this potential on the rod 27 will cause a gaseous discharge to take place at the point where the charged rod 27 passes through a grounded screen 31 to indicate that a target is present at the elevation and azimuth represented by that particular rod and at the range represented by that particular screen. Such an image representative of a target is shown as the cross-hatched area 41 in Fig. 1. This image shows the target to be at a range represented by the second screen and at an elevation and azimuth represented by the rod 27 shown passing through it. If the beams are sharp enough and the increments of range represented by the screen spacing are small enough with relation to the dimensions of a target, the size, shape and attitude of the target can be indicated. In this case several holes in several screens will be caused to glow in locations indicative of the target's location within the scanned volume and of its size, shape and attitude. Where the scanning speed is long with respect to the duration of the glow discharge, the wires of the screens 31 may be coated with a phosphor having a persistence approximating the time required for the arm 33 to complete a revolution which, in turn, will be determined by the interval between transmitted pulses.

It is possible for the presentation of this invention to represent only a portion of the total range on an enlarged scale. This is done by using the communicating and keying arrangements described in my above-cited copending application; that is, by appropriate gear shifting, the use of a different commutator and switching, the screens are successively charged, beginning at a time after the transmitter is triggered, corresponding to the minimum range desired, and are all successively charged in the interval of range desired.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. A system for indicating the position of objects in a volume comprising means for transmitting periodic pulses of energy, a plurality of detectors of such periodic pulses after reflection adapted to respond each to reflected pulses received from a different part of the scanned volume, a discharge device comprising a plurality of spaced apart apertured conductive electrodes positioned along the axis of the device at distances corresponding to discrete ranges, means for connecting said electrodes to a reference potential at times dependent upon the velocity of propagation of the transmitted energy, a plurality of rods, one in each of the openings in the electrodes, means connecting each rod to the detected output of an associated detector in a manner to produce a gaseous discharge between a rod associated with a detector receiving energy and the electrode connected to the reference potential at that instant to give an image at a position corresponding to the posiion of the object with respect to the detecting means.

2. A system for indicating the position of objects in a volume comprising means for transmitting periodic pulses of compressional wave energy, a plurality of detectors of such periodic pulses after reflection adapted to respond each to reflected pulses received from a different part of the scanned volume, a gaseous discharge device comprising a plurality of spaced apart apertured conductive electrodes positioned along the axis of the device at distances corresponding to discrete ranges, means for connecting said electrodes to a reference potential at times dependent upon the velocity of propagation of the transmitted energy, a plurality of rods, one in each of the openings in the electrodes, means connecting each rod to the detected output of an associated detector in a manner to produce a gaseous discharge between a rod associated with a detector receiving energy and the electrode connected to the reference potential at that instant to give an image at a position corresponding to the position of the object with respect to the detecting means.

3. A system for indicating the position of objects in a volume comprising means for transmitting periodic pulses of energy, a plurality of transducers capable of detecting such periodic pulses of compressional wave energy after reflection adapted to respond each to reflected pulses received from a different part of the scanned volume, a gaseous discharge device comprising a plurality of spaced apart apertured conductive electrodes positioned along the axis of the device at distances corresponding to discrete ranges, means for connecting said electrodes to a reference potential at times dependent upon the velocity of propagation of the transmitted energy, a plurality of rods, one in each of the openings in the electrodes, means connecting each rod to the detected output of an associated transducer in a manner to produce a gaseous discharge between a rod associated with a transducer receiving energy and the electrode connected to the reference potential at that instant to give an image at a position corresponding to the position of the object with respect to the transducers.

4. A system for indicating the position of objects in a volume comprising means for transmitting periodic pulses of energy, a plurality of detectors of such periodic pulses after reflection adapted to respond each to reflected pulses received from a different part of the scanned volume, a gaseous discharge device comprising a plurality of spaced apart screens positioned along the axis of the device at distances corresponding to discrete ranges, means for connecting said screens to a reference potential at times dependent upon the velocity of propagation of the transmitted energy, a plurality of rods, one in each of the openings in the screens, means connecting each rod to the detected output of an associated detector in a manner to produce a gaseous discharge between a rod associated with a detector receiving energy and the screen connected to the reference potential at that instant to give an image at a position corresponding to the position of the object with respect to the detecting means.

5. A system for indicating the position of objects in a volume comprising means for transmitting periodic pulses of compressional wave energy, a plurality of transducers capable of detecting such periodic pulses of compressional wave energy after reflection adapted to respond each to reflected pulses received from a different part of the scanned volume, a gaseous discharge device comprising a plurality of spaced apart apertured conductive electrodes positioned along the axis of the device at distances corresponding to discrete ranges, means for connecting said electrodes to a reference potential at times dependent upon the velocity of propagation of the transmitted energy, a plurality of rods, one in each of the openings in the electrodes, means connecting each rod to the detected output of an associated transducer in a manner to produce a gaseous discharge between a rod associated with a transducer receiving energy and the electrode connected to the reference potential at that instant to give an image at a position corresponding to the position of the object with respect to the transducers.

6. A system for indicating the position of objects in a volume comprising means for transmitting periodic pulses of compressional wave energy, a plurality of detectors of such periodic pulses after reflection adapted to respond each to reflected pulses received from a different part of the scanned volume, a gaseous discharge device comprising a plurality of spaced apart screens positioned along the axis of the device at distances corresponding to discrete ranges, means for connecting said screens to a reference potential at times dependent upon the velocity of propagation of the transmitted energy, a plurality of rods, one in each of the openings in the screens, means connecting each rod to the detected output of an associated detector in a manner to produce a gaseous discharge between a rod associated with a detector receiving energy and the screen connected to the reference potential at that instant to give an image at a position corresponding to the position of the object with respect to the detecting means.

7. A system for indicating the position of objects in a volume comprising means for transmitting periodic pulses of energy, a plurality of transducers capable of detecting such periodic pulses of compressional wave energy after reflection adapted to respond each to reflected pulses received from a different part of the scanned volume, a gaseous discharge device comprising a plurality of spaced apart screens positioned along the axis of the device at distances corresponding to discrete ranges, means for connecting said screens to a reference potential at times dependent upon the velocity of propagation of the transmitted energy, a plurality of rods, one in each of the openings in the screens, means connecting each rod to the detected output of an associated transducer in a manner to produce a gaseous discharge between a rod associated with a transducer receiving energy and the screen connected to the reference potential at that instant to give an image at a position corresponding to the position of the object with respect to the transducers.

8. A system for indicating the position of objects in a volume comprising means for transmitting periodic pulses of compressional wave energy, a plurality of transducers capable of detecting such periodic pulses of compressional wave energy after reflection adapted to respond each to reflected pulses received from a different part of the scanned volume, a gaseous discharge device comprising a plurality of spaced apart screens positioned along the axis of the device at distances corresponding to discrete ranges, means for connecting said screens to a reference potential at times dependent upon the velocity of propagation of the transmitted energy, a plurality of rods, one in each of the openings in the screens, means connecting each rod to the detected output of an associated transducer in a manner to produce a gaseous discharge between a rod associated with a transducer receiving energy and the screen connected to the reference potential at that instant to give an image at a position corresponding to the position of the objects with respect to the transducers.

9. A system for indicating the position of objects in a volume comprising means for transmitting periodic pulses of energy, a plurality of detectors of such periodic pulses after reflection adapted to respond each to reflected pulses received from a different part of the scanned volume, a discharge device comprising a plurality of spaced apart screens having a coating of phosphor positioned along the axis of the device at distances corresponding to discrete ranges, means for connecting said screens to a reference potential at times dependent upon the velocity of propagation of the transmitted energy, a plurality of rods, one in each of the openings in the screens, means connecting each rod to the detected output of an associated detector in a manner to produce a gaseous discharge between a rod associated with a detector receiving energy and the screen connected to the reference potential at that instant to give an image at a position corresponding to the position of the object with respect to the detecting means.

10. A system for indicating the position of objects in a volume comprising means for transmitting periodic pulses of compressional wave energy, a plurality of detectors of such periodic pulses after reflection adapted to respond each to reflected pulses received from a different part of the scanned volume, a discharge device comprising a plurality of spaced apart screens having a coating of phosphor positioned along the axis of the device at distances corresponding to discrete ranges, means for connecting said screens to a reference potential at times dependent upon the velocity of propagation of the transmitted energy, a plurality of rods, one in each of the openings in the screens, means connecting each rod to the detected output of an associated detector in a manner to produce a gaseous discharge between a rod associated with a detector receiving energy and the screen connected to the reference potential at that instant to give an image at a position corresponding to the position of the object with respect to the detecting means.

11. A system for indicating the position of objects in a volume comprising means for transmitting periodic pulses of energy, a plurality of transducers capable of detecting such periodic pulses of compressional wave energy after reflection adapted to respond each to reflected pulses received from a different part of the scanned volume, a gaseous discharge device comprising a plurality of spaced apart screens having a coating of phosphor positioned along the axis of the device at distances corresponding to discrete ranges, means for connecting said screens to a reference potential at times dependent upon the velocity of propagation of the transmitted energy, a plurality of rods, one in each of the openings in the screens, means connecting each rod to the detected output of an associated transducer in a manner to produce a gaseous discharge between a rod associated with a transducer receiving energy and the screen connected to the reference potential at that instant to give an image at a position corresponding to the position of the object with respect to the transducers.

12. A system for indicating the position of objects in a volume comprising means for transmitting periodic pulses of compressional wave energy, a plurality of transducers capable of detecting such periodic pulses of compressional wave energy after reflection adapted to respond each to reflected pulses received from a different part of the scanned volume, a gaseous discharge device comprising a plurality of spaced apart screens having a coating of phosphor positioned along the axis of the device at distances corresponding to discrete ranges, means for connecting said screens to a reference potential at times dependent upon the velocity of propagation of the transmitted energy, a plurality of rods, one in each of the openings in the screens, means connecting each rod to the detected output of an associated transducer in a manner to produce a gaseous discharge between a rod associated with a transducer receiving energy and the screen connected to the reference potential at that instant to give an image at a position corresponding to the position of the object with respect to the transducers.

13. A system for indicating the position of objects in a volume comprising means for transmitting periodic pulses of energy, a plurality of detectors of such periodic pulses after reflection adapted to respond each to reflected pulses received from a different part of the scanned volume, a gaseous discharge device comprising a plurality of spaced apart apertured conductive electrodes having a coating of phosphor positioned along the axis of the device at distances corresponding to discrete ranges, means for connecting said electrodes to a reference potential at times dependent upon the velocity of propagation of the transmitted energy, a plurality of rods, one in each of the openings in the electrodes, means connecting each rod to the detected output of an associated detector in a manner to produce a gaseous discharge between a rod associated with a detector receiving energy and the electrode connected to the reference potential at that instant to give an image at a position corresponding to the position of the object with respect to the detecting means.

14. A discharge device including a plurality of spaced apart apertured conductive electrodes whose positions along the longitudinal axis of said device correspond to discrete ranges, a plurality of rods, each extending through corresponding openings in each of said electrodes, an envelope enclosing said electrodes and rods arranged so that when a potential is applied between a rod and an electrode a discharge takes place between the rod and the screen at the point where the rod passes through the electrode.

15. A gaseous discharge device including a plurality of spaced apart screens whose position along the longitudinal axis of said device corresponds to discrete ranges, a plurality of rods, each extending through corresponding openings in each of said screens, an envelope enclosing said screens and rods and an ionizable gas so that when a potential is applied between a rod and a screen a discharge takes place between the rod and the screen at the point where the rod passes through the screen.

16. A discharge device including a plurality of spaced apart apertured conductive electrodes with a phosphor coating whose positions along the longitudinal axis of said device correspond to discrete ranges, a plurality of rods, each extending through corresponding openings in each of said electrodes, an envelope enclosing said electrodes and rods arranged so that when a potential is applied between a rod and an electrode a discharge takes place between the rod and the screen at the point where the rod passes through the electrode.

17. A gaseous discharge device including a plurality of spaced apart screens with a phosphor coating whose positions along the longitudinal axis of said device correspond to discrete ranges, a plurality of rods, each extending through corresponding openings in each of said screens, an envelope enclosing said screens and rods and an ionizable gas so that when a potential is applied between a rod and a screen a discharge takes place between the rod and screen at the point where the rod passes through the screen.

No references cited.